United States Patent
Rehman

(10) Patent No.: US 7,800,499 B2
(45) Date of Patent: Sep. 21, 2010

(54) RFID AND SENSOR SIGNING ALGORITHM

(75) Inventor: Samuelson Rehman, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 279 days.

(21) Appl. No.: 11/758,532

(22) Filed: Jun. 5, 2007

(65) Prior Publication Data

US 2008/0303667 A1    Dec. 11, 2008

(51) Int. Cl.
*G08B 13/14* (2006.01)

(52) U.S. Cl. ............... 340/572.1; 340/10.1; 340/10.51; 713/161; 713/166; 713/167; 713/170; 713/176; 713/181; 380/280

(58) Field of Classification Search .......... 340/572, 340/572.1, 825.69, 825.72, 5.8, 10.51, 10.1; 341/176; 235/385; 713/176, 161, 166, 167, 713/170, 181; 455/410; 380/280
See application file for complete search history.

(56) References Cited

U.S. PATENT DOCUMENTS

| | | | |
|---|---|---|---|
| 5,365,516 A | 11/1994 | Jandrell | |
| 6,600,418 B2 | 7/2003 | Francis et al. | |
| 6,843,415 B2 | 1/2005 | Vogler | |
| 2003/0144985 A1* | 7/2003 | Ebert | 707/1 |
| 2003/0227392 A1* | 12/2003 | Ebert et al. | 340/825.49 |
| 2006/0080732 A1 | 4/2006 | Ohkubo et al. | |
| 2006/0181397 A1* | 8/2006 | Limbachiya | 340/10.51 |
| 2006/0230276 A1* | 10/2006 | Nochta | 713/176 |
| 2007/0257857 A1 | 11/2007 | Marino et al. | |
| 2008/0024268 A1* | 1/2008 | Wong et al. | 340/5.8 |
| 2008/0030335 A1 | 2/2008 | Nishida et al. | |

* cited by examiner

*Primary Examiner*—Benjamin C Lee
*Assistant Examiner*—Quang Pham
(74) *Attorney, Agent, or Firm*—Townsend and Townsend and Crew LLP

(57) ABSTRACT

In various embodiments, a method for signing tags associated with objects includes receiving a first identifier associated with a tag. A first signature is generated for the tag based on the identifier and a public key. The first identifier and the first signature are then stored in the tag.

20 Claims, 9 Drawing Sheets

RFID AND SENSOR SIGNING ALGORITHM

CROSS-REFERENCES TO RELATED APPLICATIONS

The present disclosure may be related to the following commonly assigned applications/patents:

This application is related to co-pending U.S. patent application Ser. No. 11/685,655 filed Mar. 13, 2007 and entitled "Virtualization and Quality of Data;"

This application is related to co-pending U.S. patent application Ser. No. 11/685,673 filed Mar. 13, 2007 and entitled "Real-Time and Offline Location Tracking Using Passive RFID Technologies;" and This application is related to co-pending U.S. patent application Ser. No. 11/758,538, filed Jun. 5, 2007 and entitled "RFID Key Rotation Algorithm System;"

The respective disclosures of these applications/patents are incorporated herein by reference in their entirety for all purposes.

BACKGROUND OF THE INVENTION

Embodiments of the present invention generally relate to Radio Frequency Identification (RFID) applications. More specifically, embodiments of the present invention relate to techniques generating signatures associated with RFID tags.

Radio Frequency Identification (RFID) is an automatic identification method which relies on the storing and remotely retrieving of data using devices, such as RFID tags or transponders. RFID tags or transponders are also known as proximity, proxy, or contactless cards, because data from an RFID tag can be retrieved without physical contact. Generally, a device, such as an RFID reader, uses radio waves to remotely retrieve a unique identifier stored using the RFID tag when the RFID tag is within proximity of the RFID reader. RFID tags can be attached to or incorporated into a product, animal, or person for the purpose of identification by the RFID reader. RFID readers can be placed on doorways, in train cars, over freeways, mounted on vehicles, and also can be embodied in mobile handheld devices.

RFID technologies have been traditionally implemented in different ways by different manufacturers, although global standards are being developed. Thus, computer applications using RFID are also typically hard-coded to specific RFID devices sold by the same manufacture. One problem with this arrangement is that these computer applications have traditionally been limited to using only the sensor data retrieved from the vendor supplied RFID readers.

Moreover, in order to provide automated shipping and receiving, real-time inventory, automated shipping and received, and real-time security, other types of RFID sensor devices, such as environment sensors (e.g., temperature and humidity sensors), location sensors (e.g., Global Positioning System or GPS devices), and notification devices, may be required. Accordingly, with the addition of each sensor device, a specific application may be required to access the sensor data from the sensor device. This vendor lock-in leads to having too many non-integrated applications, creates unnecessary complexity, and also increases costs associated with the management and deployment of RFID technologies.

One solution is to embed the sensor device with the RFID tag. For example, one cold chain solution provides an RFID tag embedded with a temperature sensor. Cold chain refers to a temperature-controlled supply chain. An unbroken cold chain is an uninterrupted series of storage and distribution activities which maintain a given temperature range. A reader can read both the identifier of the RFID as well as the temperature from the embedded sensor.

However, by embedding sensors with RFID tags, the cost, and complexity associated with each RFID tag increase. Furthermore, computer applications configured to read the sensor data are still tied directly to specific RFID readers. Thus, the only items for which sensor data can be used from those applications are still those that can be tagged and directly sensed using the specific vendor supplied RFID readers.

Accordingly, what is desired are improved methods and apparatus for solving the problems discussed above, while reducing the drawbacks discussed above.

BRIEF SUMMARY OF THE INVENTION

Embodiments of the present invention generally relate to Radio Frequency Identification (RFID) applications. More specifically, embodiments of the present invention relate to techniques generating signatures associated with RFID tags.

In various embodiments, a method for signing tags associated with objects includes receiving a first identifier associated with a tag. A first signature is generated for the tag based on the identifier and a public key. The first identifier and the first signature are then stored in the tag.

In some embodiments, generating the first signature for the tag includes generating a hash key using the first identifier and the public key with a hash function. Information may be received from the tag using a reader. The first identifier may be determined based on the received information. The first signature may be determined based on the received information. The first identifier associated with the tag may then be authenticated based on the first signature and a private key associated with the public key.

In one embodiment, an Electronic Product Code (EPC) identifier associated with an object is received. The first identifier may be generated based on the EPC identifier. In various embodiments, a window may be received indicative of validity of the first identifier. A determination may be made whether reception of the first identifier from the tag satisfies the window. A signal is generated indicating validity of the first identifier based on the determination.

In some embodiments, the first identifier may includes a reduced number of bits than that which may be stored in the tag. In still further embodiments, a second identifier for the tag is generated based on a rotation scheme. A second signature for the tag is then generated based on the second identifier and the public key. The second identifier and the second signature may be stored in the tag.

In one embodiment, a data processing system includes a processor and a memory. The memory is coupled to the processor and configured to store a plurality of code modules which when executed by the processor cause the processor to receive a first identifier associated with a tag, generate a first signature for the tag based on the identifier and a public key, and generate one or more instructions to store the first identifier and the first signature in the tag.

In another embodiment, a computer program product is stored on a computer readable medium for signing tags associated with objects. The computer program product includes code for receiving a first identifier associated with a tag, code for generating a first signature for the tag based on the identifier and a public key, and code for storing the first identifier and the first signature in the tag.

A further understanding of the nature and the advantages of the inventions disclosed herein may be realized by reference of the remaining portions of the specification and the attached drawings.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings.

DETAILED DESCRIPTION OF THE INVENTION

Embodiments of the present invention generally relate to sensor technologies and more specifically to techniques for virtualization and quality of sensor data. In order to better understand the present invention, aspects of the environment within which the invention operates will first be described.

In order to better understand the present invention, aspects of the environment within which various embodiments operate will first be described.

Collection of Sensor Data

In various embodiments, methods and systems for collection of sensor data that may incorporate embodiments of the present invention augment enterprise software with RFID and sensor technologies. The methods and systems generally provides a faster reasons loop, greater visibility, an extensible framework, and scalability for the collection of sensor data from a variety of sensor devices and the processing of sensor data by a variety of applications. The systems typically can be deployed in locations where sensor devices can provide better insight into business processes.

In various embodiments, the methods and systems provide localized management and control of sensor devices through an extensible framework and interface. The methods and systems can funnel data sensor and environment data from RFID readers and sensor device, typically located at the periphery of an enterprise, for access by core applications.

Figure 1:
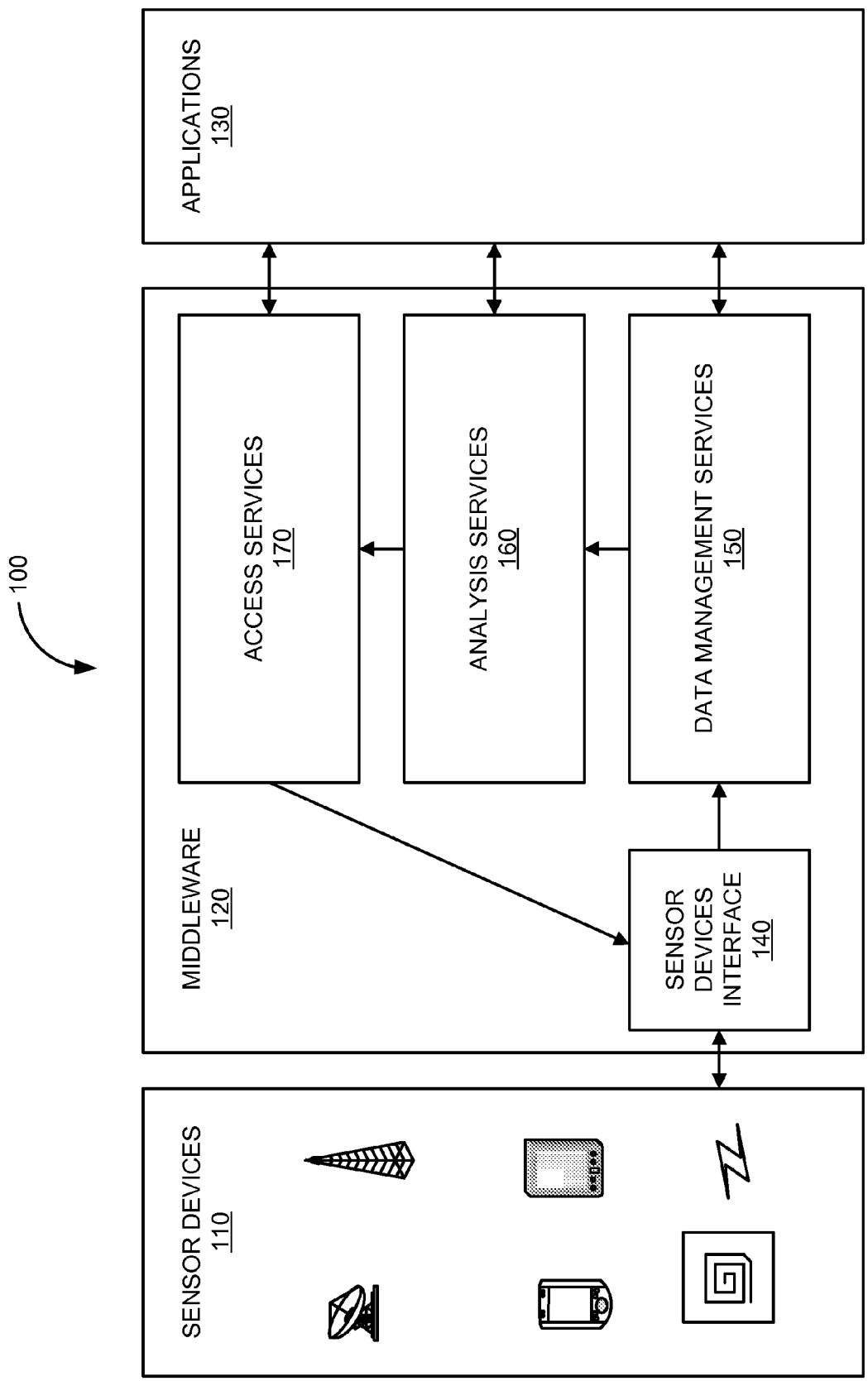
FIG. 1 is a simplified block diagram of a system that may incorporate embodiments of the present invention.

FIG. 1 illustrates a simplified block diagram of a system 100 that may incorporate embodiments of the present invention. FIG. 1 is merely illustrative of an embodiment incorporating the present invention and does not limit the scope of the invention as recited in the claims. One of ordinary skill in the art would recognize other variations, modifications, and alternatives.

As shown in FIG. 1, system 100 includes sensor devices 110, middleware 120, and applications 130. Middleware 120 is communicatively coupled to sensor devices 110 and to applications 130. Middleware 120 includes sensor devices interface 140, data management services 150, analysis service 160, and access services 170.

Sensor devices 110 include contactless cards, transponders, RFID tags, smart labels, fixed interrogators/readers, mobile readers, handheld readers, image capture devices, video captures devices, audio capture devices, environmental sensing devices (e.g., temperature, humidity, and air pressure sensors), location information devices (e.g., Global Positioning System), weight sensing devices, notification and alert generation devices, and the like. One example of an RFID tag is described further with respect to FIG. 2. One example of an RFID reader is described further with respect to FIG. 3. In some embodiments, sensor devices 110 include hardware and/or software elements that respond to external input from middleware 120 to perform actions, manipulate objects, and the like.

In general, middleware 120 includes hardware and/or software elements that provide an interface for using sensor devices 110. In this example, middleware 120 includes sensor devices interface 140, data management services 150, analysis service 160, and access services 170.

Sensor devices interface 140 includes hardware and/or software elements that communicate with sensor devices 110. One example of sensor devices interface 140 is Oracle's Application Server: Sensor Edge Server from Oracle Corporation, Redwood Shores, Calif. In various embodiments, sensor devices interface 140 receives sensor data from sensor devices 110. In some embodiments, sensor devices interface 140 communicates with one or more of sensor devices 110 to provide external input from middleware 120 to cause the one or more of sensor devices 110 to display notifications and alerts, and to perform responses, actions, or activities (e.g., control a conveyor belt or robot).

In general, sensor data is any information, signal, communication, and the like, received from sensor devices 110. Some examples of sensor data are unique, or semi-unique identifiers associated with RFID tags, temperature information received from a temperature sensor, data and information associated with humidity and pressure, position and location information, still-image data, video sequence data, motion picture data, audio data, and the like.

Data management services 150 include hardware and/or software elements that provide storage of and access to collected sensor data. Some examples of data management services 150 include databases, storage arrays, storage area networks, network attached storage, data security devices, data management devices, and the like.

Analysis services 160 include hardware and/or software elements that provide analysis of collected sensor data. Some examples of analysis which may be performed by analysis services 160 include business intelligence, business process management, inventory management, distribution and supply chain management, accounting, reporting, and the like.

Access services 170 include hardware and/or software elements that provide access to features of middleware 120. In various embodiments, access services 170 include hardware and/or software elements that manage sensor devices 110 through sensor devices interface 140. In some embodiments, access services 170 include hardware and/or software elements provide access to sensor data via data management services 150. In some embodiments, access services 170 include hardware and/or software elements that provide access to analysis services 160. For example, in various embodiments, access services 170 provides one or more users or computer processes with a portal using web services to access sensor data from analysis services 160 and data management services 150. In further embodiments, access services 170 allows the one or more users or computer processes to initiate or coordinate actions or activities using sensor devices 110 through sensor devices interface 140.

Applications 130 include hardware and/or software elements that access sensor data and/or control sensor devices 110 through middleware 120. Some examples of applications 130 are Oracle's E-Business Suite, PeopleSoft Enterprise, and JD Edwards Enterprise from Oracle Corporation, Redwood Shores, Calif.

In one example of operation, system 100 collects sensor data from one or more of sensor devices 110 (e.g., an RFID reader). For example, a plurality of RFID readers detect the presents of a plurality of RFID tags at various times during the movement of objects in a warehouse or at locations in a supply-chain.

In this example, middleware 120 collects the sensor data via sensor devices interface 140, and stores the sensor data using data management services 150. Middleware 120 provides access and analysis of collected and stored sensor data to applications 130 via analysis service 160 and access services 170. Accordingly, system 100 provides a framework for accessing a wide variety of sensor devices to obtain sensor data from a variety of applications.

In various embodiments, system 100 deployed in locations where sensor devices 110 can provide better insight into business processes. System 100 provides greater visibility of sensor data by allowing non-vendor specific applications to have access to sensor data. This extensible framework also provides scalability for the collection of sensor data from a variety of sensor devices. In various embodiments, system 100 provides localized management and control of sensor devices 100 through middleware 130 and sensor devices interface 140.

Figure 2:
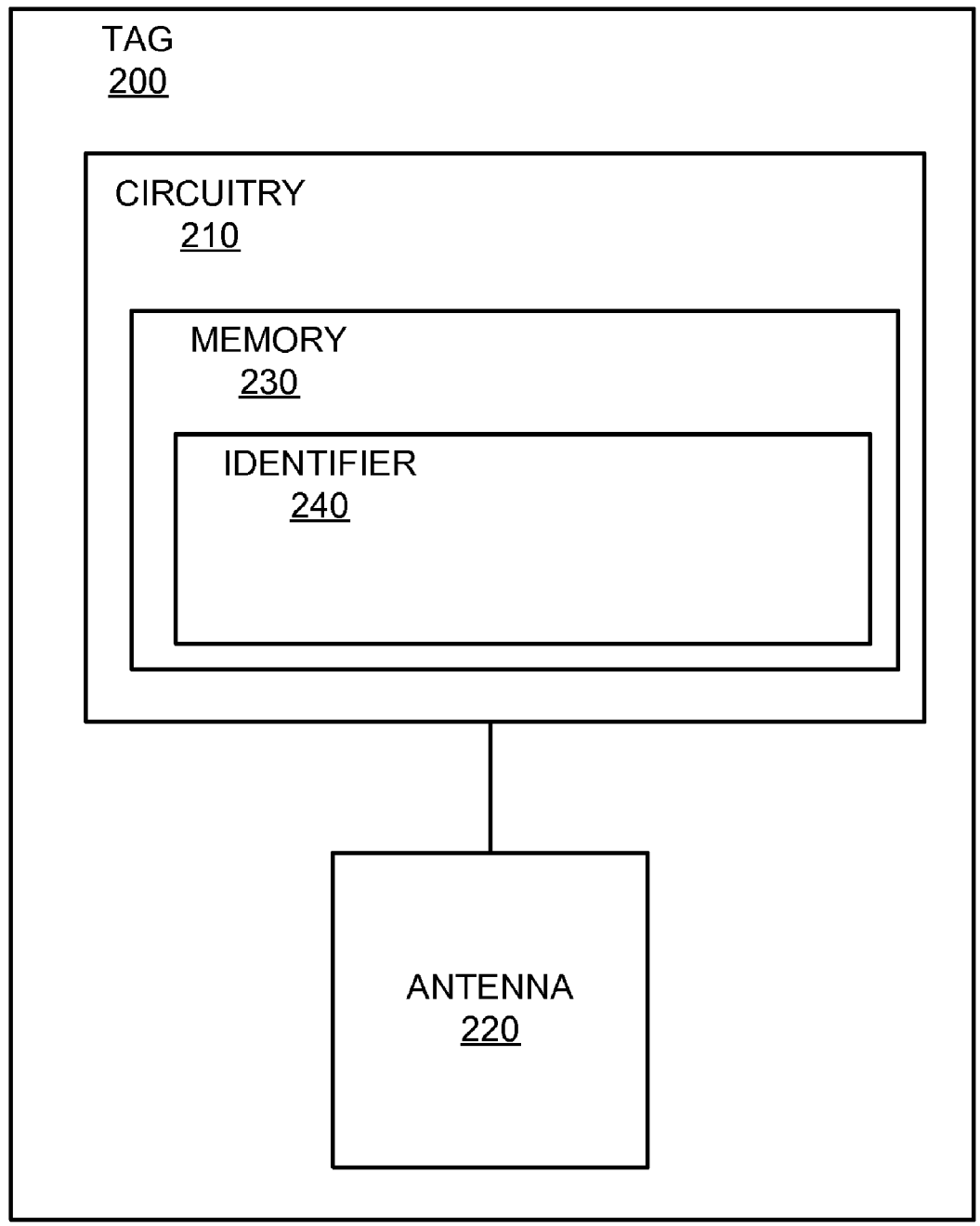
FIG. 2 is a block diagram of a tag in one embodiment according to the present invention.

FIG. 2 is a block diagram of a tag 200 in one embodiment according to the present invention. In this example, tag 200 includes circuitry 210 coupled to an antenna 220. Circuitry 210 includes a memory 230. Memory 230 includes an identifier 240.

In operation, tag 200 typically obtains power to operate circuitry 210 from an inductive coupling of tag 200 to energy circulating around a reader coil (e.g., low frequency, high frequency, very high frequency, and ultra high frequency radio waves). In some embodiments, tag 200 operates in a low frequency (LF) band (e.g., 13.56 MHz). Alternatively, tag 200 may use radiative coupling, such as in ultra-high frequency (UHF) and microwave RFID systems to energize circuitry 210 which in turn communicates data (e.g., identifier 240) stored in memory 230 via antenna 220. Antenna 220 typically is a conductive element that enables circuitry 210 to communicate data.

In general, tag 200 and other contactless cards, smart labels, transponders, and the like, typically use three basic technologies: active, passive, and semi-passive. Active tags typically use a battery to power microchip circuitry and transmit signals to readers. Active tags can generally be read from distances of 100 ft. or more. Passive tags do not include a battery. Instead, passive tags draw power from a magnetic field that is formed by the coupling of an antenna element in the tags with the coiled antenna from a reader. Semi-passive tags are similar to active tags in that they use a battery to run microchip circuitry. However, in semi-passive tags, the battery generally is not used to broadcast a signal to the reader.

In various embodiments, circuitry 210 may include an RF interface and control logic, in addition to memory 230, combined in a single integrated circuit (IC), such as a low-power complementary metal oxide semiconductor (CMOS) IC. For example, the RF interface can be an analog portion of the IC, and the control logic and memory 230 can be a digital portion of the IC. Memory 230 may be a non-volatile read-write memory, such as an electrically erasable programmable read only memory (EEPROM).

In some embodiments, circuitry 210 includes an antenna tuning capacitor and an RF-to-DC rectifier system designed for Antenna 220, which is the coupling element for tag 200. Antenna 210 can enable tag 200 using passive RFID to obtain power to energize and active circuitry 210. Antenna 220 can have many different shapes and sizes, depending on the type of coupling system (e.g., RFID) being employed.

Some examples of tag 200 are ISO 11784 & 11785 tags, ISO 14223/1 tags, ISO 10536 tags, ISO 14443 tags, ISO 15693 tags, ISO 18000 tags, EPCglobal, ANSI 371.1, 2 and 3, AAR S918, and the like.

In some embodiments, circuitry 210 of tag 200 is configured to read from and write to memory 230. Identifier 240 is generally a unique serial number. Identifier 240 may also be hard coded into circuitry 210. In some embodiments, information such as a product information and location may be encoded in memory 230 of circuitry 210.

Figure 3:
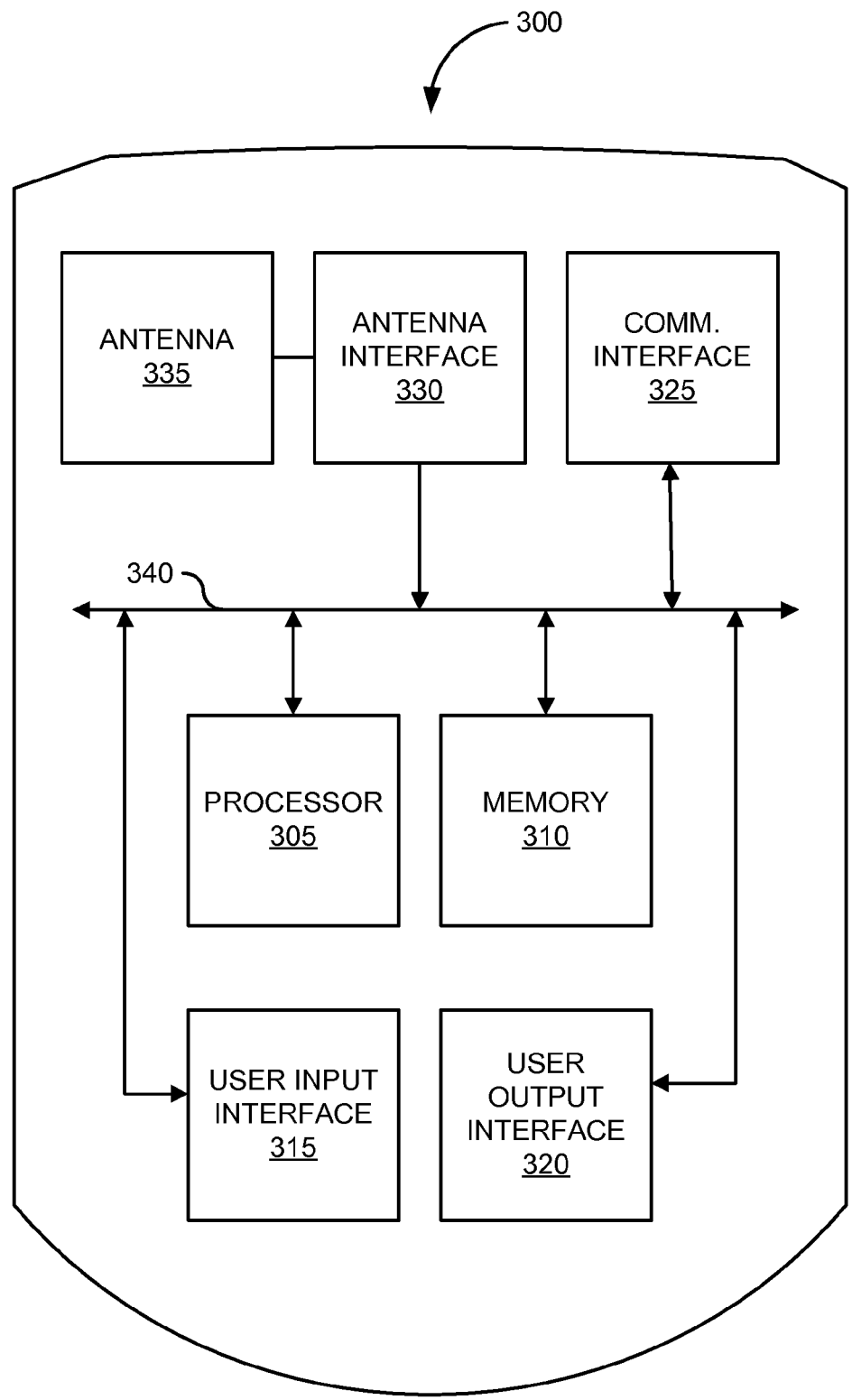
FIG. 3 is a block diagram of an interrogator/reader in one embodiment according to the present invention.

FIG. 3 is a block diagram of an interrogator/reader 300 in one embodiment according to the present invention. In this example, reader 300 includes a processor 305, a memory 310, a user input interface 315, a user output interface 320, a communications interface 325, an antenna interface 330, an antenna 335, and a system bus 340. Processor 305, memory 310, user input interface 315, user output interface 320, communications interface 325, and antenna interface 330 are coupled via system bus 340. Antenna interface 320 is linked to antenna 325.

In this example, reader 300 uses radio frequencies to communicate with tag 200 using antenna 335. For example, when tag 200 is within proximity of reader 300, tag 200 draws power from a magnetic field that is formed by the coupling of antenna 220 from tag 200 with antenna 335 from reader 300. Circuitry 210 from tag 200 then transmits identifier 240 via antenna 220. Reader 300 detects the transmission using antenna 335 and receives identifier 240 through antenna interface 330. In some embodiments, reader 300 stores the identifier 240 in memory 310. Reader 300 may transmit data, including identifier 240, in digital or analog form to sensor devices interface 140 using communications interface 325.

In various embodiments, reader 300 uses low, high, ultra-high, and microwave frequencies to store and retrieve data from products or devices using RFID tags.

Figure 4:
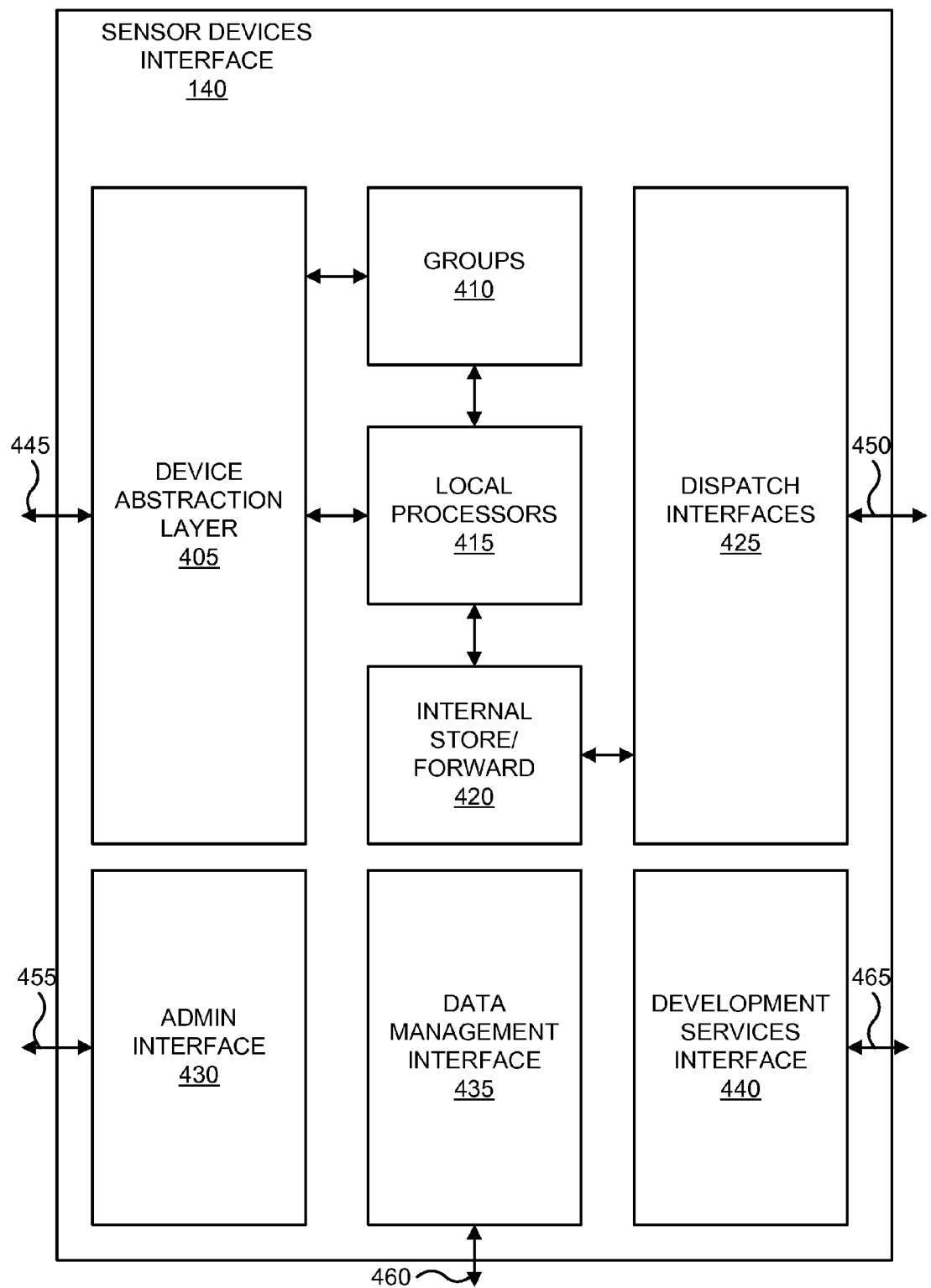
FIG. 4 is a block diagram of a system for interfacing with sensor devices to provide virtualization and quality of data in one embodiment according to the present invention.

FIG. 4 is a block diagram of sensor devices interface 140 for interfacing with sensor devices 110 to provide virtualization and quality of data in one embodiment according to the present invention.

In this example, sensor devices interface 140 includes device abstraction layer 405, groups module 410, local processors 415, internal store/forward module 420, dispatch interfaces 425, administration interfaces 430, data management interface 435, and development services interface 440. Device abstraction layer 405 is linked to groups module 410 and local processors 415. Local processors 415 are linked to groups module 410 and to internal store/forward module 420. Internal store/forward module 420 is link to dispatch interface 425.

Device abstraction layer 405 communicates via line 445 with sensor devices 110 to received collected sensor data and drive operations of one or more of sensor devices 110. Dispatch interface 425 communicates collected sensor data via line 450 with one or more applications, such as analysis services 160 and applications 130. Administration interface 430 is link via line 455 to one or more computers systems that administer the operations of sensor devices interface 140. Data management interface 435 communicates collected sensor data via line 460 with data repositories, such as a database provided by data management services 150. Development services interface 440 communicates via line 465 with applications to provide an Application Program Interface (API) to collected sensor data and operations of one or more of sensor devices 110.

Device abstraction layer 405 includes hardware and/or software elements that received collected sensor data and drive the operations of one or more of sensor devices 110. In one embodiment, device abstraction layer 405 provides a plug-and-play architecture and extendable driver framework that allows applications (e.g., Applications 130) to be device agnostic and utilize various sensors, readers, printers, and notification devices. In some embodiments, device abstraction layer 405 may include out-of-the-box drivers for readers, printers, and display/notification devices from various vendors, such as Alien of Morgan Hill, Calif. and Intermec of Everett, Wash.

Groups module 410 and local processors 415 include hardware and/or software elements that provide a framework for simple, aggregate, and programmable filtering of sensor data received from device abstraction layer 405. For example, using groups module 410, filters executed by local processors 415 are applied to a single device or to logical groups of devices to collect sensor data that satisfies predefined criteria. Local processors 415 include hardware and/or software elements for creating filters and rules using sensor data. Some examples of filters may include Pass Filter, Movement Filter, Shelf Filter, Cross Reader Filter, Check Tag Filter, Pallet Shelf Filter, Pallet Pass Filter, and Debug Filter. In some embodiments, filters and rules may be created using the JavaScript programming language and through the use of regular expressions.

Internal store/forward module 420 includes hardware and/or software elements that provide an interface between local processors 415 and dispatch interfaces 425. In one example, internal store/forward module 420 includes a buffer used for communication between local processors 415 and dispatch interfaces 424. Dispatch interfaces 425 include hardware and/or software elements that disseminate sensor data to applications (e.g., applications 130). In some embodiments, dispatch interfaces 425 include a web services component, an HTTP-dispatcher component, a stream dispatcher component, and an interface supporting subscription or query based notification services.

Administration interface 430 includes hardware and/or software elements that managing operations of sensor devices interface 140. In one example, administration interface 430 provides a task oriented user interface for adding, configuring, and removing devices, creating and enabling filters and rules, and creating and enabling dispatchers that disseminate sensor data.

Data management services 435 include hardware and/or software elements that provide reporting, associations, and archiving of sensor data. Development services interface 440 includes hardware and/or software elements that provide an Application Program Interface (API) to collected sensor data and operations of one or more of sensor devices 110. Some examples of API services provided by development services interface 440 include web services, IS services, device management, monitoring interfaces, EPC management, and raw sensor data interfaces.

In one example of operation, sensor devices interface 140 collects sensor data from sensor devices 110 (e.g., RFID readers, RFID tags or labels, temperature sensors, laser diodes, etc.) using device abstraction layer 405. Groups module 410 and local processors 415 filter, clean, and normalize the collected sensor data and forward "relevant" events, such as those that meet predefined criteria or are obtained from a selected device, to internal store/forward interface 420.

The filtered sensor data is then distributed by internal store/forward interface 420 to various distribution systems through dispatch interfaces 425. The unfiltered and/or filters sensor data may further be archived and storage using data management interface 435.

In various embodiments, sensor devices interface 140 provides a system for collection, filtering, and access to sensor data. Sensor devices interface 140 can provide management and monitoring of sensor devices 110 by printing labels, operating sensors, light stacks, message boards, carousels, and the like. In some embodiments, sensor devices interface 140 provides scalability that allows access to sensor data without being tied to one specific vendor application.

Key Signing

In general, identifiers associated with RFID tags or location tags are formed such that anyone knowing the application form of a particular RFID tag can generate a similar identifier. This can present a significant problem to supply chain and mission-critical systems, or if a hacker can generate a fake but valid identifier, a hacker can disrupt, defraud or even attack the system.

In various embodiments, system 100 may incorporate key windowing such as described in related U.S. patent application Ser. No. 11/758,538, filed Jun. 5, 2007 and entitled "RFID Key Rotation Algorithm System." Key windowing allows system 100 to reduce the number of bits required for an identifier associated with an RFID tag. System 100 then may use the remaining bits of the RFID identifier to be used for other purposes.

In various embodiments, system 100 uses the remaining bits to "sign" the RFID tag. In general, applying a signature to an RFID tag allows system 100 to reduce the possibility of fake tags, and other attacks that can disrupt normal operations. In one embodiment, a "signing" may be the application of a hash function such as SHA-1 to the identifier associated with an RFID tag, and then encrypting the resulting hash code with a public key. System 100 then appends the result of this encrypted hash code to the end of the identifier associated with the tag to form the complete tag ID. The complete "signed" tag ID then may be written or printed to the RFID tag. In various embodiments, the encrypted hash (or signature) is designated as the last 32 bits of the tag ID.

Figure 5:
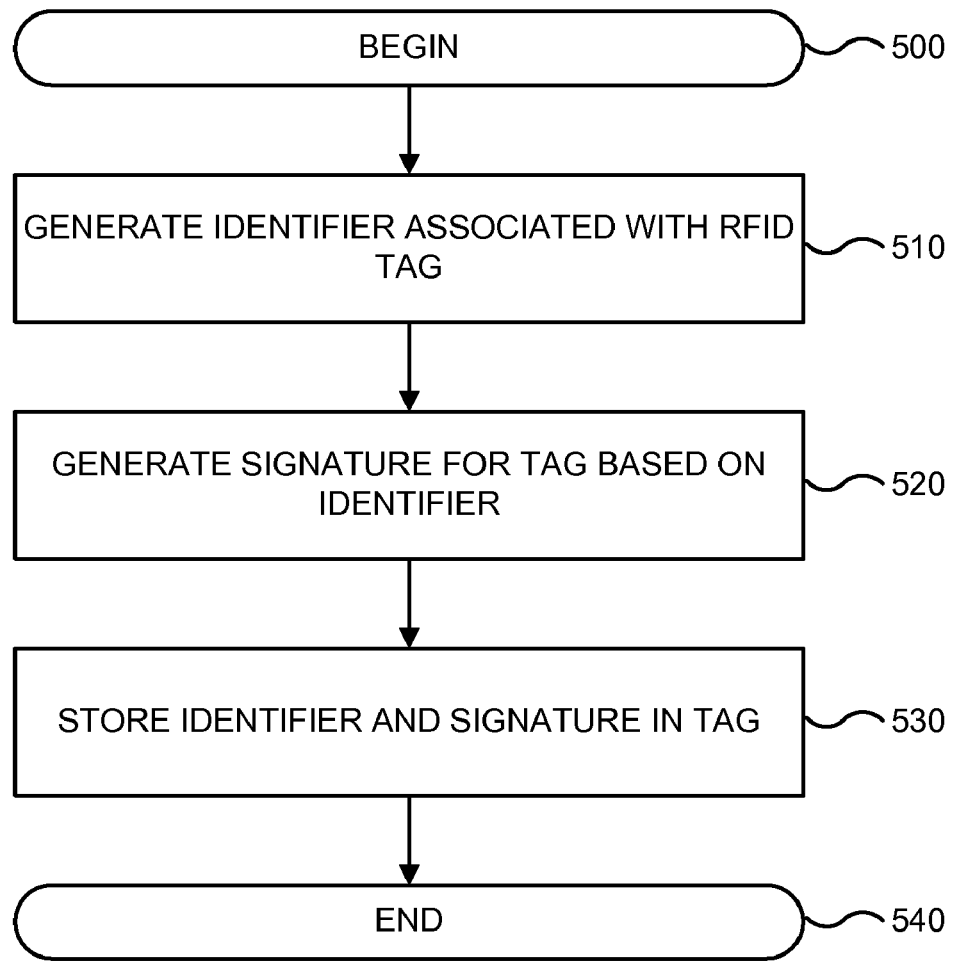
FIG. 5 is a simplified flowchart for signing an RFID tag in one embodiment according to the present invention.

FIG. 5 is a simplified flowchart for signing an RFID tag in one embodiment according to the present invention. The processing depicted in FIG. 5 may be performed by software modules (e.g., instructions or code) executed by a processor of a computer system, by hardware modules of the computer system, or combinations thereof. In this example, processing is performed by sensor devices interface 140. FIG. 5 begins in step 500.

In step 510, sensor devices interface 140 generates an identifier or otherwise receives an identifier associated with an RFID tag. For example, sensor devices interface 140 receives a UPC or EPC code associated with an object. Sensor devices interface 140 generates a reduced bit identifier (e.g., a 32-bit identifier vs. a 128-bit identifier).

In step 520, sensor devices interface 140 generates a signature for the tag based on a private key and the identifier. A "signature" refers to any mechanism for indicating the source, validity, authenticity, and the like, of data. For example, an MD5 has may be used to indicate the validity, data integrity, or authenticity of a file. In another example, various encryption schemes, such as SHA-1, AES, HMAC, and the like, may be used to provide data integrity, privacy, and authenticity.

In step 530, sensor devices interface 140 writes or prints the identifier and a signature to the RFID tag. FIG. 5 ends in step 540.

Figure 6:
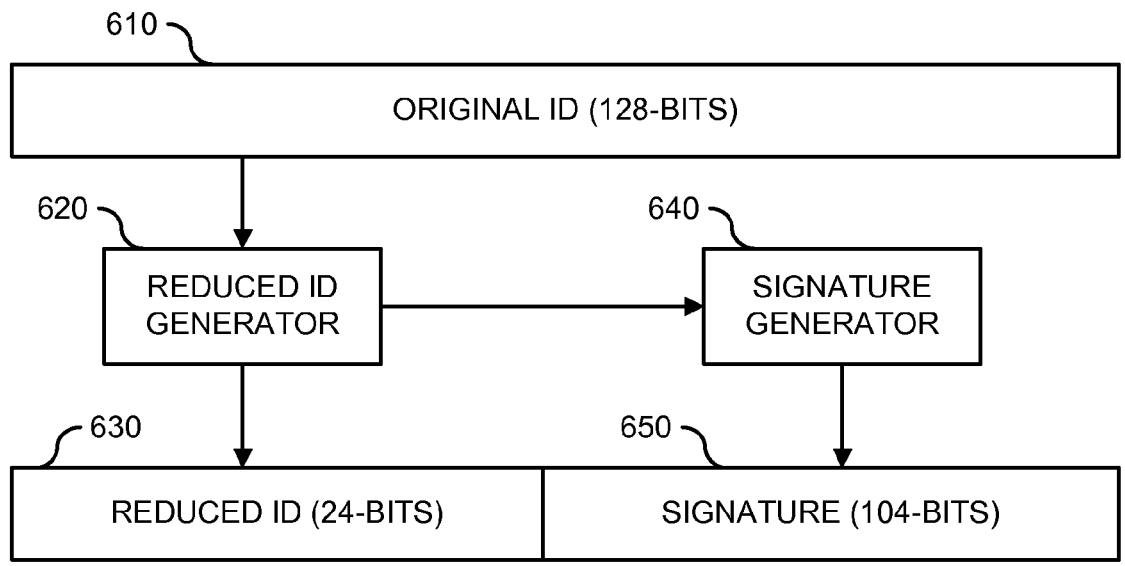
FIG. 6 is a block diagram illustrating generation of a reduced a bit ID and a signature in one embodiment according to the present invention.

FIG. 6 is a block diagram illustrating generation of a reduced bit ID and a signature in one embodiment according to the present invention. FIG. 6 includes an original ID 610, a reduced ID generate 620, a reduced ID 630, a signature generator 640, and a signature 650. As shown in FIG. 6, original ID 610 includes 128 bits. Original ID 610 may be an RFID key, an EPC identifier, a UPC identifier, and the like.

Reduced ID generator 620 (e.g., sensor devices interface 140) generates reduced ID 630. In this example, reduced ID 630 includes 24 bits, although other bit lengths may be used. Reduced ID 630 may be generated using a function or mapping based on original ID 610, or from a random seed or nonce. Signature generator 640 (e.g., sensor devices interface 140) generates signature 650. In this example, signature generator 640 generates signature 650 based on the reduced ID 630 to include 104 bits, although other bit lengths may be used. Sensor devices interface 140 writes, prints, or stores reduced ID 630 and signature 650 in an RFID tag.

Figure 7:
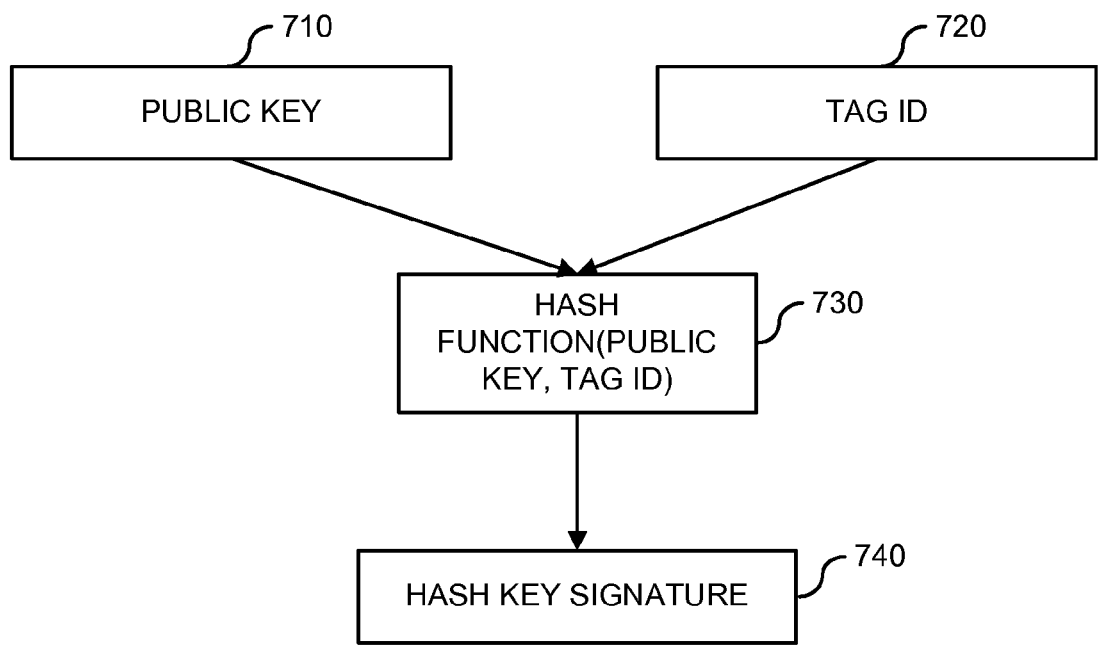
FIG. 7 is a block diagram illustrating generation of a hash key signature based on a private key in one embodiment according to the present invention.

FIG. 7 is a block diagram illustrating generation of a hash key signature based on a private key in one embodiment according to the present invention. FIG. 7 includes a public key 710, a tag ID 720, a hash function 730, a hash key signature 740. As shown in FIG. 7, private key 710 and tag ID 720 are used as parameters for hashing function 730. In various embodiments, sensor devices interface 140 uses a SHA-1 function for hashing function 730. Hash function 730 then generates hash key signature 740. Sensor devices interface 140 uses hash key signature 740 as a signature for tag ID 720, and writes tag ID 720 and hash key signature 740 to an RFID tag.

Figure 8:
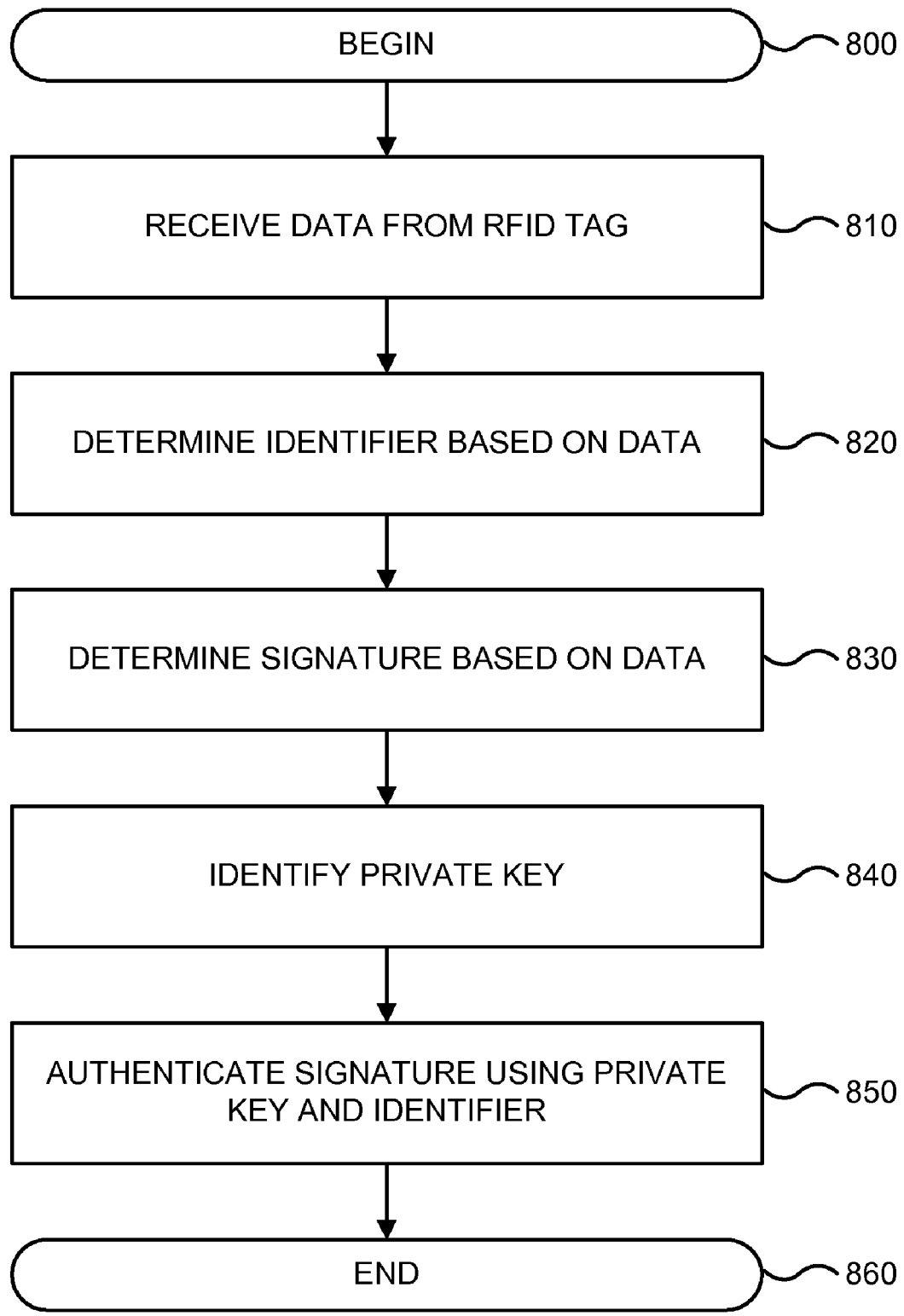
FIG. 8 is a flowchart for authenticating a signed RFID tag in one embodiment according to the present invention.

FIG. 8 is a flowchart for authenticating a signed RFID tag in one embodiment according to the present invention. FIG. 8 begins in step 800.

In step 810, sensor devices interface 140 receives data from an RFID tag. In step 820, sensor devices interface 140 determines an identifier based on the data. For example, sensor devices interface 140 may recognize the first 32 bits of the data as the identifier.

In step 830, sensor devices interface 140 determines a signature based on the data. For example, sensor devices interface 140 may recognize the remaining bits (e.g., 96 bits) after the first 32 bits of the data as the signature.

In step 840, sensor devices interface 140 identifies a private key. In various embodiments, sensor devices interface 140 uses a single private key-public key pair (e.g., FIG. 7). In some embodiments, sensor devices interface 140 may identify one or more private keys. For example, sensor devices interface 140 may use the first four bits of the identifier to determine a private key/public key pair from one or more key pairs.

In step 850, sensor devices interface 140 authenticates the signature using the private key in the identifier. For example, sensor devices interface 140 may decrypt the signature using the private key. Sensor devices interface 140 then may determine whether the identifier received from the RFID tag matches the decrypted signature. FIG. 8 ends in step 860.

Figure 9:
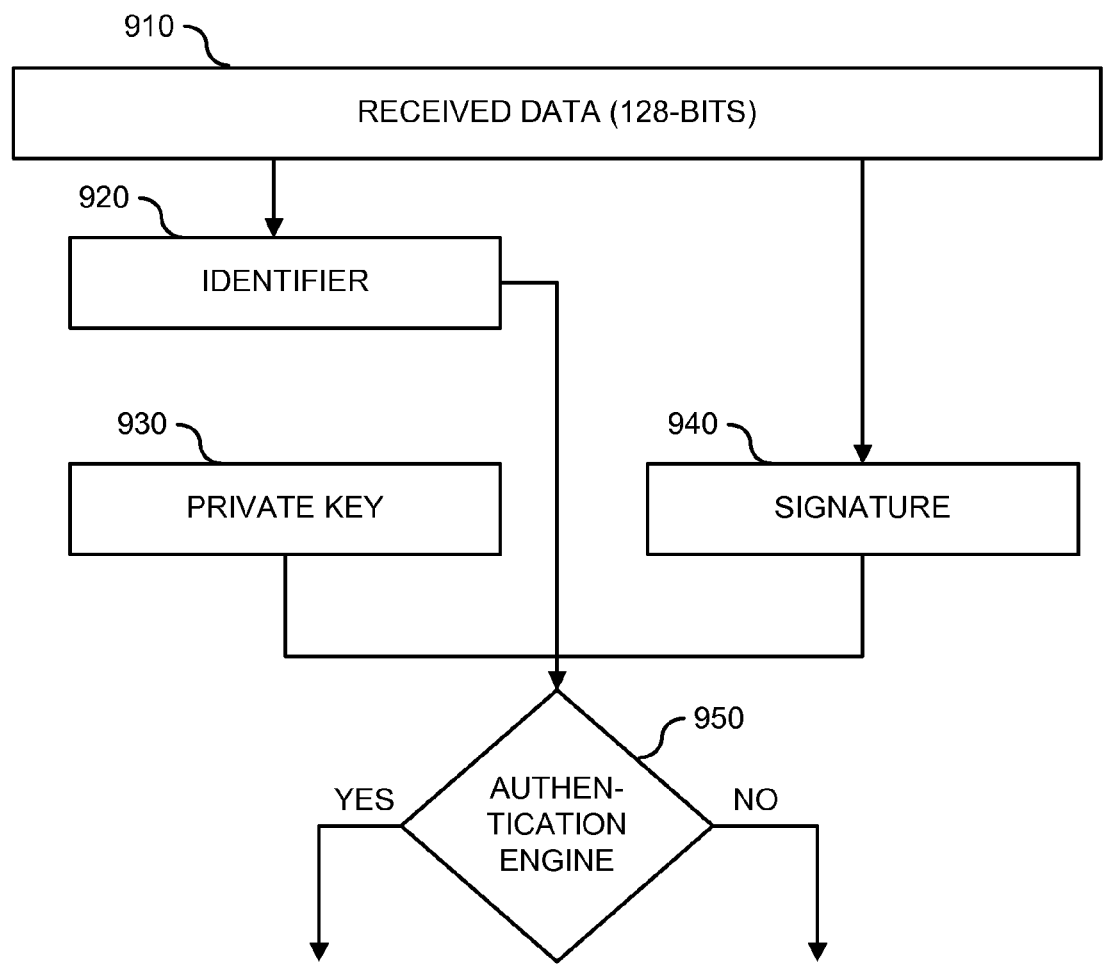
FIG. 9 is a block diagram illustrating authentication of an RFID tag using a public key in one embodiment according to the present invention.

FIG. 9 is a block diagram illustrating authentication of an RFID tag using a public key in one embodiment according to the present invention. FIG. 9 includes received data 910, an identifier 920, a private key 930, a signature 940, and an authentication engine 950 (e.g., sensor devices interface 140). As shown in FIG. 9, received data 910 includes 128 bits. In various embodiments, sensor devices interface 140 determines identifier 920 and signature 940 from received data 910.

Authentication engine 950 receives private key 930 and signature 940, and potentially identifier 920, to authenticate identifier 920 to generate a yes or no authenticated result. In some embodiments, authentication engine 950 may generate a signal indicating the authenticity of identifier 920 or received data 910.

As described above, system 100 provides for secure "signing" of RFID tags. This allows the mitigation of fake or hacked identifiers, and reduces disruptions of service and fraud.

Figure 10:
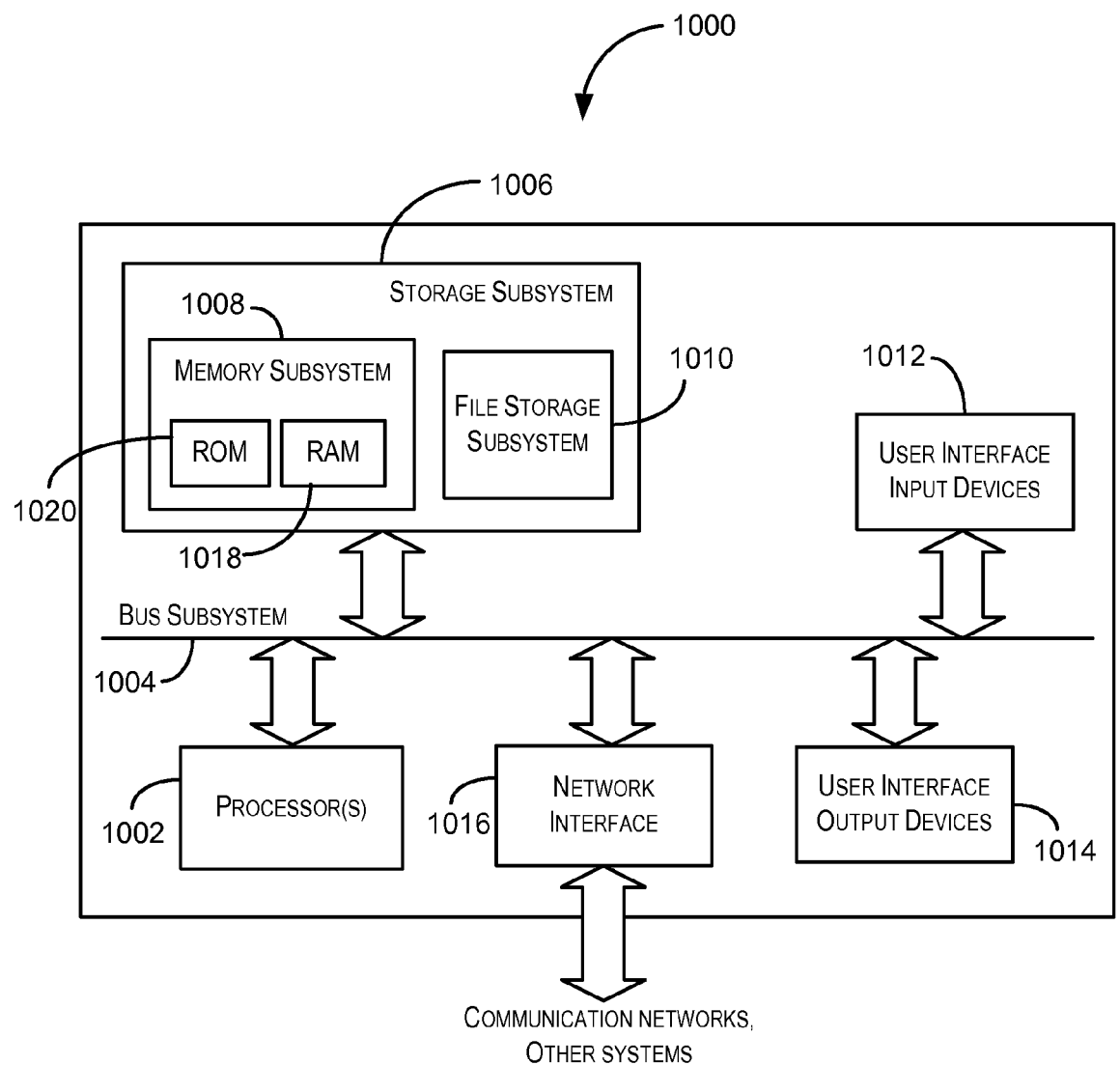
FIG. 10 is a simplified block diagram of a computer system that may be used to practice embodiments of the present invention.

FIG. 10 is a simplified block diagram of a computer system 1000 that may be used to practice embodiments of the present invention. As shown in FIG. 10, computer system 1000 includes a processor 1002 that communicates with a number of peripheral devices via a bus subsystem 1004. These peripheral devices may include a storage subsystem 1006, comprising a memory subsystem 1008 and a file storage subsystem 1010, user interface input devices 1012, user interface output devices 1014, and a network interface subsystem 1016.

Bus subsystem 1004 provides a mechanism for letting the various components and subsystems of computer system 1000 communicate with each other as intended. Although bus subsystem 1004 is shown schematically as a single bus, alternative embodiments of the bus subsystem may utilize multiple busses.

Network interface subsystem 1016 provides an interface to other computer systems, and networks, and devices. Network interface subsystem 1016 serves as an interface for receiving data from and transmitting data to other systems from computer system 1000.

User interface input devices 1012 may include a keyboard, pointing devices such as a mouse, trackball, touchpad, or graphics tablet, a scanner, a barcode scanner, a touchscreen incorporated into the display, audio input devices such as voice recognition systems, microphones, and other types of input devices. In general, use of the term "input device" is intended to include all possible types of devices and mechanisms for inputting information to computer system 1000.

User interface output devices 1014 may include a display subsystem, a printer, a fax machine, or non-visual displays such as audio output devices, etc. The display subsystem may be a cathode ray tube (CRT), a flat-panel device such as a liquid crystal display (LCD), or a projection device. In general, use of the term "output device" is intended to include all possible types of devices and mechanisms for outputting information from computer system 1000.

Storage subsystem 1006 may be configured to store the basic programming and data constructs that provide the functionality of the present invention. Software (code modules or instructions) that provides the functionality of the present invention may be stored in storage subsystem 1006. These software modules or instructions may be executed by processor(s) 1002. Storage subsystem 1006 may also provide a repository for storing data used in accordance with the present invention. Storage subsystem 1006 may comprise memory subsystem 1008 and file/disk storage subsystem 1010.

Memory subsystem 1008 may include a number of memories including a main random access memory (RAM) 1018 for storage of instructions and data during program execution and a read only memory (ROM) 1020 in which fixed instructions are stored. File storage subsystem 1010 provides persistent (non-volatile) storage for program and data files, and may include a hard disk drive, a floppy disk drive along with associated removable media, a Compact Disk Read Only Memory (CD-ROM) drive, a DVD, an optical drive, removable media cartridges, and other like storage media.

Computer system 1000 can be of various types including a personal computer, a portable computer, a workstation, a network computer, a mainframe, a kiosk, or any other data processing system. Due to the ever-changing nature of computers and networks, the description of computer system 1000 depicted in FIG. 10 is intended only as a specific example for purposes of illustrating the preferred embodiment of the computer system. Many other configurations having more or fewer components than the system depicted in FIG. 10 are possible.

Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments. Additionally, although the present invention has been described using a particular series of transactions and steps, it should be apparent to those skilled in the art that the scope of the present invention is not limited to the described series of transactions and steps.

Further, while the present invention has been described using a particular combination of hardware and software, it should be recognized that other combinations of hardware and software are also within the scope of the present invention. The present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

What is claimed is:

1. A computer-implemented method for signing tags associated with objects, the method comprising:

receiving, at a computer system that provides one or more applications with tracking information associated with the objects, a first identifier associated with an object, the first identifier configured to be used by the one or more applications to obtain tracking information associated with the object from the computer system;

determining, with a processor associated with the computer system, a bit-reducing scheme for generating identifiers to be stored in tags;

generating, with the processor associated with the computer system, a second identifier for a tag associated with the object based on the bit-reducing scheme applied to the first identifier, the second identifier having a predetermined key portion set according to the bit-reducing scheme and configured to be stored in the tag and readable by one or more tag reading devices to recognize the tag when in the presence of the tag, the second identifier being different from the first identifier and having a smaller number of bits than the first identifier;

generating, with the processor associated with the computer system, information reserved in secret from the one or more applications that associates the first identifier associated with the object with the second identifier for the tag such that the one or more applications obtain first tracking information from the computer system for the object based on the first identifier, the first tracking information derived from at least one of the one or more tag reading devices in response to an authentication from reading the second identifier from the tag;

determining, with the processor associated with the computer system, a private key-public key pair for the bit-reducing scheme from a plurality of private key-public key pairs accessible to the computer-system; wherein said key pair corresponds to said predetermined key portion;

generating, with the processor associated with the computer system, a first signature for the tag based on and in response to encrypting the second identifier with a selected public key in the private key-public key pair;

storing the second identifier and the first signature in the tag.

2. The method of claim 1 wherein encrypting the second identifier with the selected public key comprises generating a hash key using the second identifier and the selected public key with a hash function.

3. The method of claim 1 further comprising:

receiving, at the computer system, information from the tag in response to a reading of the tag using a tag reading device;

determining, with the processor associated with the computer system, the second identifier based on the received information;

determining, with the processor associated with the computer system, that the private key-public key pair corresponds to the second identifier based on the predetermined key portion of the second identifier;

determining, with the processor associated with the computer system, the first signature based on the received information; and authenticating, with the processor associated with the computer system, the the tag based on the second identifier and decrypting the first signature with a selected private key in the corresponding private key-public key pair.

4. The method of claim 1 further comprising:

receiving, at the computer system, an EPC identifier associated with an object as the first identifier; and generating, with the processor associated with the computer system, the second identifier based on the EPC identifier.

5. The method of claim 1 wherein generating the information associating the first identifier associated with the object and the second identifier comprises generating information associating the first identifier with a third identifier related to the second identifier, the method further comprising:

receiving, at the computer system, a window for the bit-reducing scheme indicative of validity of the second identifier, the window specifying a range mask to be applied to the second identifier to generate the third identifier;

determining, with the processor associated with the computer system, the first identifier for the object based on the second identifier, the window specifying the range mask to be applied to the second identifier to generate the third identifier, and the information associating the first identifier associated with the object and the third identifier related to the second identifier; and generating, with the processor associated with the computer system, the first tracking information for the object based on the first identifier in response to authenticating the tag.

6. The method of claim 1 wherein generating, with the processor associated with the computer system, the second identifier comprises generating an identifier having a reduced number of bits than that which may be stored in the tag.

7. The method of claim 1 further comprising:

generating, with the processor associated with the computer system, a third identifier for the tag associated with the object based on the bit-reducing scheme according to a rotation scheme, the third identifier having a predetermined key portion according to the bit-reducing scheme and configured to be stored in the tag and readable by one or more tag reading devices to recognize the tag when in the presence of the tag, the third identifier being different from the first identifier and the second identifier and having a smaller number of bits than the first identifier;

generating, with the processor associated with the computer system, information reserved in secret from the one or more applications that associates the first identifier associated with the object with the third identifier for the tag such that the one or more applications obtain second tracking information from the computer system for the object based on the first identifier, the second tracking information derived from at least one of the one or more tag reading devices in response to an authentication from reading the third identifier from the tag;

generating, with the processor associated with the computer system, a second signature for the tag based on and in response to encrypting the third identifier with the selected public key in the private key-public key pair; and storing the third identifier and the second signature in the tag.

8. A data processing system for signing tags associated with objects, the system comprising:

a processor; and a memory coupled to the processor, the memory storing a plurality of code modules which when executed by the processor configure the processor to:

receive a first identifier associated with an object, the first identifier being used by one or more applications to obtain tracking information associated with the object;

determine a bit-reducing scheme applied to the first identifier for generating identifiers to be stored in tags;

generate a second identifier for the a tag associated with the object based on the bit-reducing scheme, the second identifier having a predetermined key portion according to the bit-reducing scheme and configured to be stored in the tag and readable by one or more tag reading devices to recognize the tag when in the presence of the tag, the second identifier being different from the first identifier and having a smaller number of bits than the first identifier;

generate information reserved in secret from the one or more applications that associates the first identifier associated with the object with the second identifier such that the one or more applications obtain first tracking information for the object based on the first identifier, the first tracking information derived from at least one of the one or more tag reading devices in response to an authentication from reading the second identifier from the tag;

store the information associating the first identifier associated with the object with the second identifier in a database;

determine a private key-public key pair for the bit-reducing scheme from a plurality of private key-public key pairs; wherein said key pair corresponds to said predetermined key portion;

generate a first signature for the tag based on and in response to encrypting the second identifier with a selected public key in the private key-public key pair; and generate one or more instructions to store the second identifier and the first signature in the tag.

9. The system of claim 8 wherein the processor is further configured to generate a hash key using the second identifier and the public key with a hash function.

10. The system of claim 8 wherein the processor is further configured to:

receive information from the tag in response to a reading of the tag using a tag reading device;

determine the second identifier based on the received information;

determine that the private key-public key pair corresponds to the second identifier based on the predetermined key portion of the second identifier;

determine the first signature based on the received information; and authenticate the tag based on the second identifier and decrypting the first signature with a selected private key in the corresponding private key-public key pair.

11. The system of claim 8 wherein the processor is configured to:

receive an EPC identifier associated with an object as the first identifier; and generate the second identifier based on the EPC identifier.

12. The system of claim 8 wherein the processor is configured to:

generate information associating the first identifier with a third identifier related to the second identifier to generate the information associating the first identifier associated with the object and the second identifier;

receive a window for the bit-reducing scheme indicative of validity of the second identifier, the window specifying a range mask to be applied to the second identifier to generate the third identifier;

determine the first identifier for the object based on the second identifier, the window specifying the range mask to be applied to the second identifier to generate the third identifier, and the information associating the first identifier associated with the object and the third identifier related to the second identifier; and generate the first tracking information based on the first identifier in response to authenticating the tag.

13. The system of claim 8 wherein the second identifier comprises a reduced number of bits than that which may be stored in the tag.

14. The system of claim 8 wherein the processor is configured to:

generate a third identifier for the tag associated with the object based on the bit-reducing scheme according to a rotation scheme, the third identifier having a predetermined key portion according to the bit-reducing scheme and configured to be stored in the tag and readable by one or more tag reading devices to recognize the tag when in the presence of the tag, the third identifier being different from the first identifier and the second identifier and having a smaller number of bits than the first identifier;
generate information reserved in secret from the one or more applications that associates the first identifier associated with the object with the third identifier for the tag such that the one or more applications obtain second tracking information for the object based on the first identifier, the second tracking information derived from at least one of the one or more tag reading devices in response to an authentication from reading the third identifier from the tag;
generate a second signature for the tag based on and in response to encrypting the third identifier with the selected public key in the private-key-public key pair; and
generate one or more instructions to store the third identifier and the second signature in the tag.

15. A computer-readable storage medium storing a computer program product executable by one or more processors of one or more computer systems for signing tags associated with objects, the computer-readable storage medium comprising:
code for receiving a first identifier associated with an object, the first identifier being used by one or more applications to obtain tracking information associated with the objects;
code for determining a bit-reducing scheme applied to the first identifier for generating identifiers to be stored in tags;
code for generating a second identifier for a tag associated with the object based on a bit-reducing scheme, the second identifier having a key predetermined portion according to the bit-reducing scheme and configured to be stored in the tag and readable by one or more tag reading devices to recognize the tag when in the presence of the tag, the second identifier being different from the first identifier and having a smaller number of bits than the first identifier;
code for generating information reserved in secret from the one or more applications that associates the first identifier associated with the object with the second identifier such that the one or more applications obtain first tracking information for the object based on the first identifier, the first tracking information derived from at least one of the one or more tag reading devices in response to an authentication from reading the second identifier from the tag;
code for determining a private key-public key pair for the bit-reducing scheme from a plurality of private key-public key pairs; wherein said key pair corresponds to said predetermined key portion;
code for generating a first signature for the tag based on and in response to encrypting the second identifier with a selected public key in the private-key-public key pair; and
code for storing the second identifier and the first signature in the tag.

16. The computer-readable storage medium of claim 15 wherein the code for generating the first signature for the tag comprises code for generating a hash key using the second identifier and the public key with a hash function.

17. The computer-readable storage medium of claim 15 further comprising:
code for receiving information from the tag in response to a reading of the tag using a tag reading device;
code for determining the second identifier based on the received information;
code for determining that the private key-public key pair corresponds to the second identifier based on the key predetermined portion of the second identifier;
code for determining the first signature based on the received information; and
code for authenticating the tag based on the second identifier and decrypting the first signature with a selected private key in the corresponding private key-public key pair.

18. The computer-readable storage medium of claim 15 further comprising:
code for receiving an EPC identifier associated with an object as the first identifier; and
code for generating the second identifier based on the EPC identifier.

19. The computer-readable storage medium of claim 15 wherein the code for generating the information associating the first identifier associated with the object and the second identifier includes code for generating information associating the first identifier with a third identifier related to the second identifier, the computer-readable storage medium further comprising:
code for receiving a window for the bit-reducing scheme indicative of validity of the second identifier, the window specifying a range mask to be applied to the second identifier to generate the third identifier;
code for determining the first identifier for the object based on the second identifier, the window specifying the range mask to be applied to the second identifier to generate the third identifier, and the information associating the first identifier associated with the object and the third identifier related to the second identifier; and
code for generating the first tracking information for the object based on the first identifier in response to authenticating the tag.

20. The computer-readable storage medium of claim 15 further comprising:
code for generating a third identifier for the tag associated with the object based on the bit-reducing scheme according to a rotation scheme, the third identifier having a key predetermined portion according to the bit-reducing scheme and configured to be stored in the tag, the third identifier being different from the first identifier and having a smaller number of bits than the first identifier;
code for generating information reserved in secret from the one or more applications that associates the first identifier associated with the object with the third identifier for the tag such that the one or more applications obtain second tracking information from the computer system for the object based on the first identifier, the second tracking information derived from at least one of the one or more tag reading devices in response to an authentication from reading the third identifier from the tag;
code for generating a second signature for the tag on based on and in response to encrypting the third identifier with the selected public key in the private key-public key pair; and
code for storing the third identifier and the second signature in the tag.

* * * * *

UNITED STATES PATENT AND TRADEMARK OFFICE
CERTIFICATE OF CORRECTION

| | | |
|---|---|---|
| PATENT NO. | : 7,800,499 B2 | Page 1 of 1 |
| APPLICATION NO. | : 11/758532 | |
| DATED | : September 21, 2010 | |
| INVENTOR(S) | : Samuelson Rehman | |

It is certified that error appears in the above-identified patent and that said Letters Patent is hereby corrected as shown below:

In column 12, line 44, in claim 3, after "the" delete "the".

In column 13, line 51, in claim 8, after "for" delete "the".

In column 15, line 15, in claim 14, delete "private-key-public" and insert -- private key-public --, therefor.

In column 15, line 56, in claim 15, delete "private-key-public" and insert -- private key-public --, therefor.

In column 16, line 59, in claim 20, after "tag" delete "on".

Signed and Sealed this
Sixteenth Day of August, 2011

David J. Kappos
*Director of the United States Patent and Trademark Office*